US007004472B2

(12) United States Patent
Diez et al.

(10) Patent No.: US 7,004,472 B2
(45) Date of Patent: Feb. 28, 2006

(54) CYLINDER HEAD GASKET

(75) Inventors: Armin Diez, Lenningen (DE); Gerald Eifler, Taunusstein (DE); Claudio Cavalloni, Regensdorf (CH); Peter Wolfer, Kleinandelfingen (CH); Michael Schnepf, Ellikon a.d. Thur (CH)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 10/885,930

(22) Filed: Jul. 6, 2004

(65) Prior Publication Data

US 2005/0006854 A1    Jan. 13, 2005

(30) Foreign Application Priority Data

Jul. 8, 2003   (DE)   ................................ 103 30 800
Apr. 8, 2004   (EP)   ................................ 04008650

(51) Int. Cl.
G01L 23/22   (2006.01)

(52) U.S. Cl. ....................... 277/318; 277/598; 73/35.12
(58) Field of Classification Search ............... 277/318, 277/598; 73/115, 35.12
See application file for complete search history.

(56) References Cited

U.S. PATENT DOCUMENTS

| 4,413,509 A | * | 11/1983 | Moser et al. ............... 73/117.3 |
| 5,195,365 A | * | 3/1993 | Chujo et al. ................... 73/115 |
| 5,380,014 A | | 1/1995 | Schäperkötter |
| 5,659,132 A | * | 8/1997 | Novak et al. ................... 73/115 |
| 6,597,088 B1 | * | 7/2003 | Glaser et al. ............... 313/118 |
| 6,701,775 B1 | * | 3/2004 | Popielas et al. ........... 73/35.12 |

FOREIGN PATENT DOCUMENTS

| EP | 0 472 219 | 2/1992 |
| EP | 0 816 663 | 1/1998 |
| EP | 1 255 099 | 11/2002 |
| JP | 02 157629 | 6/1990 |
| JP | 07 306109 | 11/1995 |

\* cited by examiner

*Primary Examiner*—Alison K. Pickard
(74) *Attorney, Agent, or Firm*—Alix, Yale & Ristas, LLP

(57) ABSTRACT

A metallic cylinder head gasket for an internal combustion engine having at least one combustion chamber. The gasket includes at least one sheet-metal layer having at least one opening corresponding to the at least one combustion chamber of the internal combustion engine and at least one bore extending from the outer edge to the edge of the opening. A membrane, closing the bore at the combustion-chamber side is exposed to the gas pressure of the combustion chamber. A pressure sensor disposed in the sheet-metal layer is pressurized axially relative to the bore by movement of the membrane by the gas pressure of the combustion chamber.

19 Claims, 2 Drawing Sheets

CYLINDER HEAD GASKET

FIELD OF THE INVENTION

The invention relates to a cylinder head gasket as it is used in combustion engines to seal the gap between the cylinder block and the cylinder head.

DESCRIPTION OF THE RELATED ART

From GB 2,317,701 A it is known per se to provide a gasket between a container and its removable cover with a pressure sensor which is integrated in the gasket and measures the pressure exerted on the gasket, and, if the pressure drops below a threshold value, indicates that a leak has possibly occurred. However, this serves to monitor the gasket and not to monitor an internal pressure.

DE 40 14 502 C2 discloses a compression-molded cylinder head gasket for an internal combustion engine, in which a sensor for sensing measured values from the region of the cylinder interior is placed into the gasket material before the compression takes place, after which the gasket is compressed in order to produce a gas-tight connection between the gasket material and embedded sensor. The sensor is a temperature sensor or a light-conducting rod, the latter passing on the current brightness values in the combustion chamber of an internal combustion engine to an electric evaluation unit. In this case, a direct measurement of the internal pressure of the cylinder is not possible or envisaged.

Also, according to U.S. Pat. No. 4,393,687, use is made of light guides which are arranged in grooves of the cylinder head gasket. Similarly, according to U.S. Pat. No. 6,301,957 B1, a light guide is used to determine the internal pressure of the cylinder.

Furthermore, it is known from WO 03/71119, in order to measure the internal pressure of the cylinder, to embed a metal tube in a recess in a cylinder head gasket, the metal tube bearing on the cylinder side a membrane which moves under the effect of the internal pressure of the cylinder, these movements causing changes in the density of a medium, such as oil, which is arranged between the membrane and an optical sensor, the changes being scanned and converted by the optical sensor. In this case too, a direct measurement of the internal pressure of the cylinder is not possible or envisaged.

U.S. Pat. No. 5,195,365 discloses a cylinder head gasket which comprises a plurality of metallic layers and in which a membrane is formed in a central layer parallel to the plane of the gasket, a recess which is open towards the cylinder being situated on one side of the membrane, so that the membrane is acted upon by the internal pressure of the cylinder. Situated on the other side is a recess which is closed towards the cylinder and is intended for accommodating a pressure sensor which picks up the movements of the membrane and converts them into electric pulses which are supplied to corresponding electric lines of an evaluation unit. Apart from the fact that the slot-like recess which is open towards the cylinder may become dirty or clogged up and therefore may result at least in falsifications of the measurement results, the pressure sensor is situated in a relatively hot region adjacent to the combustion chamber and, in addition, an insulating layer through which the lines from the pressure sensor are guided to the outside has to be arranged on the central gasket layer. However, the insulating layer and therefore the lines may become damaged by beads of the outer gasket layers resting on them.

Finally, it is known from WO 03/071167 to provide, in the case of a multi-layered cylinder head gasket, one recess per cylinder in the central layer adjacent to the edge of the combustion chamber, with a wall section which serves as the membrane remaining adjacent to the edge of the combustion chamber, to which a wire strain gauge is fastened running in the circumferential direction. This requires not only a relatively large opening but also, for sealing reasons, the opening to be restricted by means of a relatively thick wall section, which has an adverse effect on the sensitivity of the measurement.

SUMMARY OF THE INVENTION

It is therefore an object of the invention to provide a cylinder head gasket which can measure, with relatively small defect tolerances, the pressure in the cylinder of an internal combustion engine.

Another object of the invention is to provide a cylinder head gasket provided with means for measuring the pressure in the cylinder of an internal combustion engine which gasket is of simple design.

According to the invention, a metallic cylinder head gasket for an internal combustion engine is provided which is provided with one or more openings arranged next to one another corresponding to the combustion chambers of the internal combustion engine, and comprises at least one sheet-metal layer, a membrane which can be acted upon by the gas pressure of the combustion chamber being arranged adjacent to the edge of the at least one opening, the movement of which membrane can be picked up via a pressure sensor arranged in the sheet-metal layer. In this case, a bore which is closed on the combustion-space side by the membrane is provided between the outer edge of the sheet-metal layer and the edge of the opening of the particular combustion chamber, the membrane closing the bore on the combustion-chamber side, and the pressure sensor being able to be pressurized axially with respect to the bore by the membrane In a design of this type, the pressure can be measured directly without having to provide cavities which become dirty and therefore adversely effect the measurement. The design is simple at least in so tar as the feed lines to the pressure sensor can be accommodated in the bore without the risk of damage, and in that a simple axial construction is made possible in the bore, the construction permitting the pressure sensor to be accommodated in a relatively cool region of the cylinder head gasket.

This permits pressure measurements which have a standard deviation of approximately ±1 bar and are therefore equal to the pressure measurement using a conventional sheathed-element quartz pressure sensor. The effect of temperature on the pressure sensor can be kept very small and, if appropriate, can be readily corrected by means of an additive term.

This permits a very precise control of the combustion process in particular in diesel engines having common-rail or pump/nozzle injection. Deviations in the full-load injection quantity of individual cylinders, caused by tolerance-afflicted components in the injection elements, can be compensated for by the engine electronics on the basis of the measured values from the pressure sensors. The "safety margin" of the full-load peak pressure of the mechanical load limit of the engine structure can be significantly reduced. The pressure profile can be used to monitor the combustion on an individual cylinder basis Engine wear or malfunctions of the injection, exhaust-gas recirculation or boost pressure control can immediately be recognized on the basis of atypical peak pressures.

It is preferable when the membrane bears a punch. It is useful when the membrane is arranged on a head. In a preferred embodiment the head is inserted into the bore and is welded or is pressed in. The head may be clamped in a gas-tight manner against a shoulder of the bore. The head further may be part of a housing arranged in the bore. The head may be inserted into a housing arranged in the bore. The pressure sensor may be accommodated by the housing which is arranged in the bore in a manner such that it is sealed off to the outside.

The bore may have, adjacent to the opening, a shoulder against which the housing is clamped in a sealing manner. The housing may be accommodated by a hollow screw which can be actuated from the outside and is screwed into the bore. The membrane may act on the pressure sensor via a compensating disc. At least one cover plate may be provided and have a bead around each opening at a distance therefrom. In an especially preferred embodiment two cover plates are provided, with a carrier plate, between the outer edge of which and the edge of the opening of the particular combustion chamber the bore which accommodates the pressure sensor is provided, being situated between the cover plates. An elevation around the combustion-chamber serving as a spring stroke limiter for the bead may be arranged around each opening radially inwards from the particular bead on the side on which its apex is situated. The combustion-chamber elevations may be provided on the cover plates.

The pressure sensors may be connected to a control system for the injection valves and/or outlet valves of the internal combustion engine.

The pressure sensor may be a resistive, piezo-resistive, capacitive, inductive or optical sensor and preferably is a piezoelectric sensor.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENTS

Figure 1:
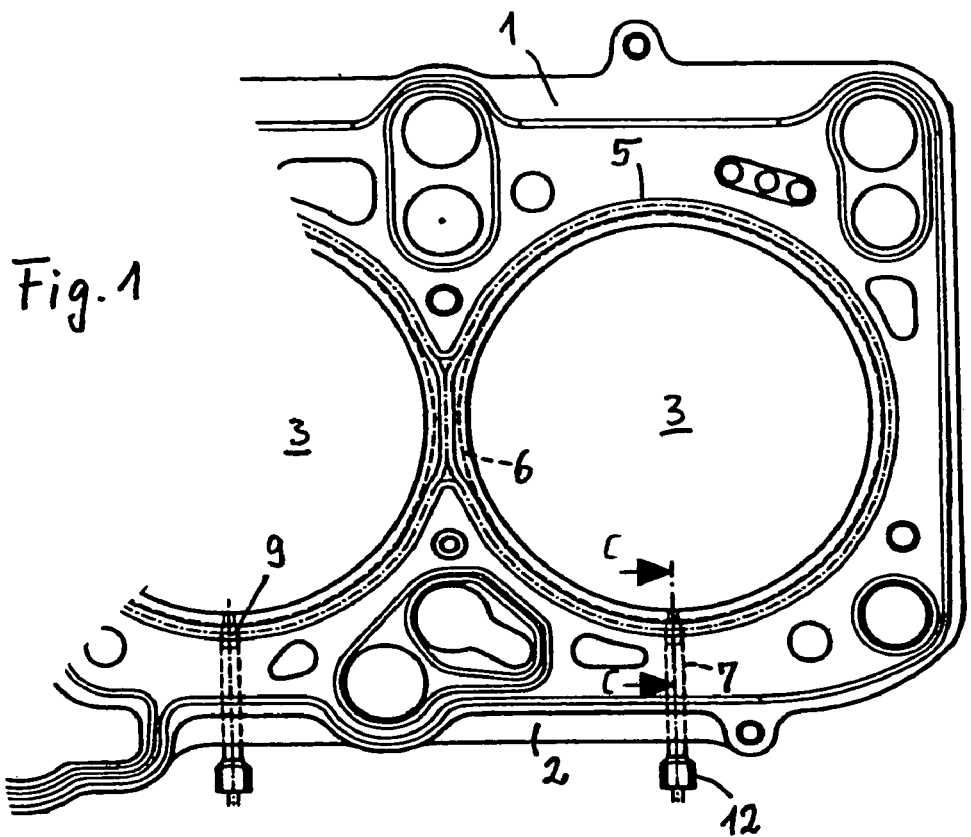
FIG. 1 is a plan view of a portion of a metallic cylinder head gasket in accordance with the invention.

The metallic cylinder head gasket which is illustrated in FIG. 1 is three-layered, comprises two cover plates 1, 1' and a carrier plate 2 and is provided with one or more openings 3 arranged next to one another corresponding to the combustion chambers of an internal combustion engine. The cover plates 1, 1' are provided with a bead 5 around each opening 3 at a distance from the latter leaving a straight sheet-metal section 4 in the edge region of the opening, the beads 5 being orientated with their apexes towards each other and enclosing the carrier plate 2 between them.

An elevation 6 at the combustion chamber serving as a spring stroke limiter for the bead 5 is situated adjacent to the particular bead 5 on the straight sheet-metal section 4 around each opening 3, i.e. radially inwards from the particular bead 5, on the side on which the apex of the bead 5 is situated. The said combustion-chamber elevations are fastened to the cover plates 1, 1', in particular are welded on, but they may also be formed integrally with the cover plates 1, 1'.

The cylinder head gasket is preferably of mirror-symmetrical design, in particular about its central plane, so that, after the cylinder head gasket is clamped between the cylinder head and cylinder block of an internal combustion engine, the carrier plate 2 is subject to the same application of force from both sides.

The two cover plates 1, 1' may be coated on both sides with a micro-sealing layer (not illustrated). However, a micro-sealing layer is to be provided in each case on both outer sides of the gasket and between two layers in each case, i.e. it is also possible for the two cover plates 1, 1' to be provided with the micro-sealing layer only on the outside and for the carrier plate 2 to be provided with it on both sides.

In the carrier plate 2, a bore 7 is provided between its outer edge and the opening edge of the particular combustion chamber, the bore having a reduced diameter in the region 8 adjacent to the combustion-chamber elevations 6, with a preferably piezoelectric, but if appropriate also a resistive (wire strain gauge), piezo-resistive, capacitive, inductive or optical pressure sensor 9 being inserted adjacent to the shoulder 10, which is formed by the region 8 of reduced diameter.

Figure 2:
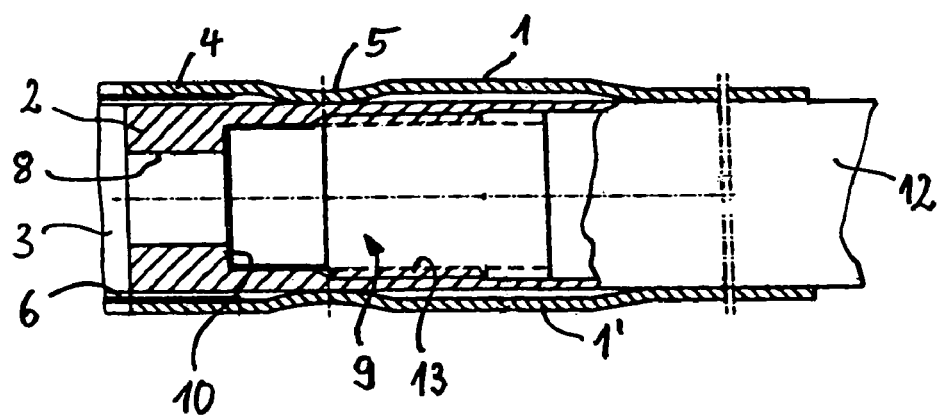
FIG. 2 is a cross-section view taken along line C—C of FIG. 1.
Figure 3:
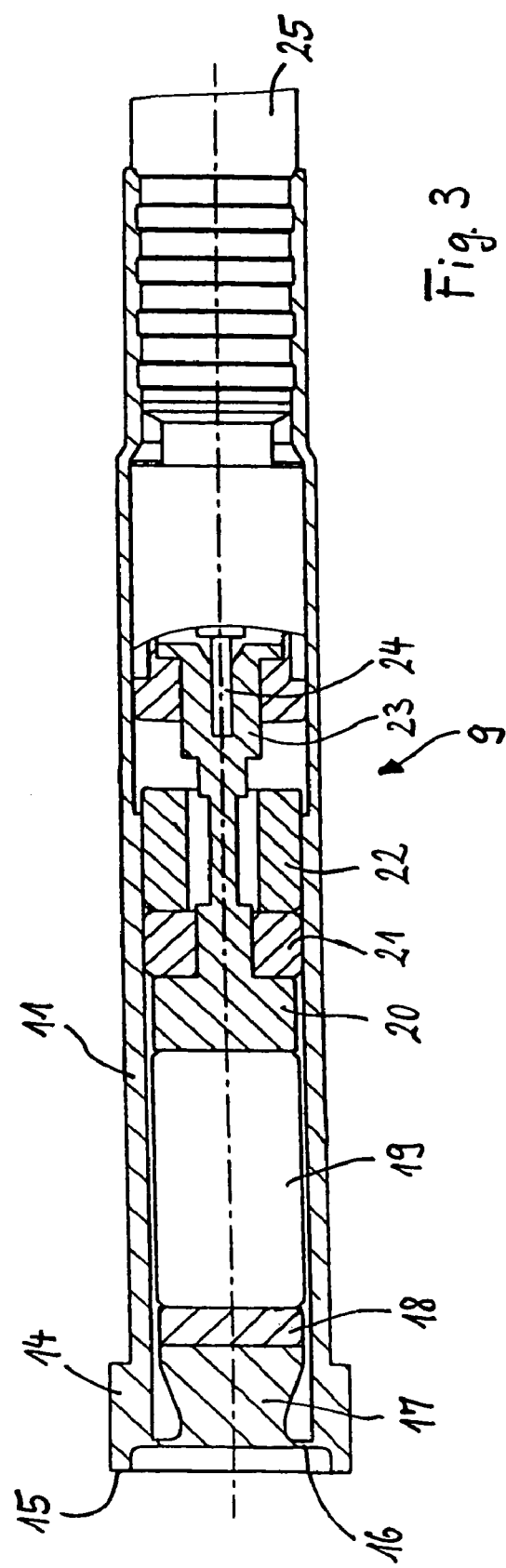
FIG. 3 is a cross-section view showing the details of the construction of a pressure sensor of the cylinder head gasket.

The pressure sensor 9 comprises a metallic housing 11 which can be accommodated, according to FIGS. 1, 2, by a hollow screw 12 which protrudes outwards and therefore can be actuated from the outside and is itself screwed to an internal threaded section 13 of the bore 7 adjacent to the shoulder 10. If appropriate, the housing 11 and hollow screw 12 could also be designed integrally with each other, i.e the housing 11 could be provided with a corresponding threaded section and screwed to the internal threaded section 13.

On the combustion-chamber side is a head 14, the end side of which has a ring 15. The region within the ring 15 is, if appropriate, set back somewhat and forms a membrane 16 with a punch 17 formed with it. The punch 17 acts via an electrically conductive compensating disc 18 on a piezoelectric crystal 19 of the pressure sensor 9, which is arranged spaced apart from the inside of the housing 11. The head 14 may be formed integrally with the housing 11 or separately therefrom, it being possible, in the latter case, for it to be welded or pressed as a separate part into the bore 7, so that it closes the bore 7 on the combustion-chamber side. If the head is formed integrally with the housing 11, it is clamped in a sealing manner against the shoulder 10, for example via the hollow screw 12.

On the side facing away from the head 14, a charge-unloading arrangement 20 (opposite electrical pole is the grounded cylinder head gasket) and a supporting ring 21 and a press-in ring 22 are provided in order to keep the crystal via the compensating disc 18 in contact with the punch 17 of the membrane 16. The charge-unloading arrangement 20 is guided through the supporting ring 21 and the press-in ring 22 and is connected via an integrally formed contact shoe 23 to a contact 24 of a cable 25 inserted in a sealed manner into the housing 11.

The pressure building up in the combustion chamber during the combustion acts via the membrane 16 of the head 14 on the end surface of the pressure sensor 9 and ultimately on its crystal 19, the state of charge of which reproduces the pressure in the combustion chamber. Owing to the fact that the head 14 closes the bore 7, no undesirable leakage takes place. The length of the punch 17 and/or of the compensating disc 18 can be selected to be of a sufficient size that an adverse effect on the pressure sensor 9 by means of correspondingly high temperatures in the region of the combustion chamber can be avoided.

In the embodiment illustrated the fact that the carrier plate 2 is fitted mirror-symmetrically between the cover plates 1, 1' and the combustion-chamber elevations 6 avoids stresses being transmitted to the pressure sensor 9 which could falsify its measurement result.

On the other hand, the cylinder head gasket may, however, also be of single-layered, two-layered (for example comprising the layers 1, 2) or more than three-layered design, depending on requirements.

The pressures measured in the individual combustion chambers can be used for controlling the injection and ignition times in order to optimize the fuel injection and the combustion on an individual combustion-chamber basis.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A metallic cylinder head gasket for an internal combustion engine having at least one combustion chamber, the gasket comprising:
    at least one sheet-metal layer having an outer edge, the at least one sheet-metal layer defining at least one opening corresponding to the at least one combustion chamber of the internal combustion engine, the at least one opening extending transversely through the at least one sheet-metal layer and having an edge, the at least one sheet-metal layer defining at least one bore corresponding to the at least one opening, the bore defining an axis and extending from the outer edge to the edge of the opening;
    a membrane sealing the at least one bore at a combustion-chamber side of the at least one bore proximate to the edge of the at least one opening, the membrane being adapted for exposure to a gas pressure of the combustion chamber; and
    a pressure sensor disposed in the sheet-metal layer, the pressure sensor being pressurized axially relative to the at least one bore by movement of the membrane by the gas pressure of the combustion chamber.

2. The cylinder head gasket according to claim 1, wherein the membrane carries a punch.

3. The cylinder head gasket according to claim 1, wherein the membrane is arranged on a head.

4. The cylinder head gasket according to claim 3, wherein the head is inserted into the at least one bore and is fastened therein by one of welding and pressing in.

5. The cylinder head gasket according to claim 3, wherein the head is clamped in a gas-tight manner against a shoulder of the at least one bore.

6. The cylinder head gasket according to claim 5, wherein a housing is arranged in the at least one bore.

7. The cylinder head gasket according to claim 6, wherein the head is part of the housing.

8. The cylinder head gasket according to claim 6, wherein the head is inserted into the housing.

9. The cylinder head gasket according to claim 6, wherein the pressure sensor is disposed within the housing and sealingly engaged therewith.

10. The cylinder head gasket according to one claim 6, wherein the housing is clamped in a sealing manner to the shoulder of the at least one bore.

11. The cylinder head gasket according to claim 6, wherein the housing is a hollow screw screwed into the at least one bore from the outer edge.

12. The cylinder head gasket according to claim 1, further comprising a compensating disc disposed intermediate the membrane and the pressure sensor.

13. The cylinder head gasket according to claim 1, wherein the at least one sheet-metal layer includes at least one cover plate having a bead around each opening at a distance therefrom, the bead having an apex.

14. The cylinder head gasket according to claim 13, wherein the at least one sheet-metal layer includes two cover plates and a carrier plate disposed between the cover plates, the carrier plate defining the at least one bore.

15. The cylinder head gasket according to claim 13, further comprising a combustion chamber elevation disposed around each opening and positioned radially inwards from the bead on a side on which the bead apex is located.

16. The cylinder head gasket according to claim 15, wherein the combustion-chamber elevations are provided on the at least one cover plate.

17. The cylinder head gasket according to claim 1, wherein the internal combustion engine includes a group of valves consisting of injection valves and outlet valves and a control system for the group of valves, the pressure sensor being adapted for connection to the control system.

18. The cylinder head gasket according to claim 1, wherein the pressure sensor is a piezoelectric sensor.

19. The cylinder head gasket according to claim 1, wherein the pressure sensor is a sensor of the group consisting of resistive, piezo-resistive, capacitive, inductive or optical sensors.

* * * * *